United States Patent
Feng et al.

(10) Patent No.: US 9,823,778 B2
(45) Date of Patent: Nov. 21, 2017

(54) METHOD AND APPARATUS FOR CONTROLLING TOUCH DEVICE, AND TOUCH DEVICE

(71) Applicants: BOE TECHNOLOGY GROUP CO., LTD., Beijing (CN); ORDOS YUANSHENG OPTOELECTRONICS CO., LTD., Ordos (CN)

(72) Inventors: Xiang Feng, Beijing (CN); Yun Qiu, Beijing (CN); Xing Wei, Beijing (CN); Zhenglong Zhu, Beijing (CN)

(73) Assignees: BOE TECHNOLOGY GROUP CO., LTD., Beijing (CN); ORDOS YUANSHENG OPTOELECTRONICS CO., LTD., Ordos (CN)

( * ) Notice: Subject to any disclaimer, the term of this patent is extended or adjusted under 35 U.S.C. 154(b) by 139 days.

(21) Appl. No.: 14/916,325

(22) PCT Filed: Sep. 18, 2015

(86) PCT No.: PCT/CN2015/089940
§ 371 (c)(1),
(2) Date: Mar. 3, 2016

(87) PCT Pub. No.: WO2016/169201
PCT Pub. Date: Oct. 27, 2016

(65) Prior Publication Data
US 2017/0060334 A1 Mar. 2, 2017

(30) Foreign Application Priority Data
Apr. 20, 2015 (CN) .......................... 2015 1 0188686

(51) Int. Cl.
*G06F 3/041* (2006.01)
*G06F 3/0346* (2013.01)
(Continued)

(52) U.S. Cl.
CPC .......... *G06F 3/0418* (2013.01); *G06F 3/0346* (2013.01); *G06F 3/0412* (2013.01);
(Continued)

(58) Field of Classification Search
CPC .... G06F 3/0346; G06F 3/0412; G06F 3/0418; G06F 3/0482; G06F 3/0487; G06F 3/04892
See application file for complete search history.

(56) References Cited

U.S. PATENT DOCUMENTS 5,633,660 A * 5/1997 Hansen ................. G06F 3/0412
345/156
5,644,653 A * 7/1997 Sunakawa ............. G06F 1/1626
382/187
(Continued)

FOREIGN PATENT DOCUMENTS

CN 102929424 A 2/2013
CN 104035670 A 9/2014
(Continued)

OTHER PUBLICATIONS

First Office Action regarding Chinese Application No. 201510188686.6, dated Apr. 20, 2017. Translation provided by Dragon Intellectual Property Law Firm.
(Continued)

*Primary Examiner* — Vijay Shankar
(74) *Attorney, Agent, or Firm* — Harness, Dickey & Pierce, P.L.C.

(57) ABSTRACT

The present disclosure provides a method for controlling a touch device, including steps of detecting an enabled
(Continued)

instruction for an assistance mode of the touch device; enabling the assistance mode when the enabled instruction for the assistance mode has been detected and displaying a preconfigured assistance mode operation interface on the touch device; and receiving an operational instruction generated when the assistance mode operation interface is operated via a physical button on the touch device and executing an operation response event corresponding to the operational instruction.

18 Claims, 12 Drawing Sheets

(51) Int. Cl.
    *G06F 3/0482*     (2013.01)
    *G06F 3/16*     (2006.01)
    *G06F 3/0487*     (2013.01)
    *G06F 11/07*     (2006.01)
    *G06F 11/22*     (2006.01)
    *G06F 3/0489*     (2013.01)

(52) U.S. Cl.
    CPC .......... *G06F 3/0482* (2013.01); *G06F 3/0487* (2013.01); *G06F 3/04892* (2013.01); *G06F 3/167* (2013.01); *G06F 11/0793* (2013.01); *G06F 11/2221* (2013.01)

(56) References Cited

U.S. PATENT DOCUMENTS

| 5,729,249 | A | * | 3/1998 | Yasutake | ............... | G06F 3/0338 |
|---|---|---|---|---|---|---|
| | | | | | | 345/157 |
| 2013/0135190 | A1 | | 5/2013 | Huang | | |
| 2017/0060334 | A1 | | 3/2017 | Feng et al. | | |

FOREIGN PATENT DOCUMENTS

| CN | 104166480 A | 11/2014 |
|---|---|---|
| CN | 104750315 A | 7/2015 |
| KR | 20130095088 A | 8/2013 |

OTHER PUBLICATIONS

International Search Report and Written Opinion of the International Searching Authority for International Application No. PCT/CN2015/089940, dated Jan. 11, 2016. Translation provided by Dragon Intellectual Property Law Firm.

* cited by examiner

METHOD AND APPARATUS FOR CONTROLLING TOUCH DEVICE, AND TOUCH DEVICE

CROSS-REFERENCE TO RELATED APPLICATIONS

The present application is the U.S. National Phase of PCT Application No. PCT/CN2015/089940 filed on Sep. 18, 2015, which claims priority to Chinese patent application No. 201510188686.6 filed on Apr. 20, 2015, each of which are incorporated herein by reference in their entirety.

TECHNICAL FIELD

The present disclosure relates to the field of electronic touch technology, in particular to a method and an apparatus for controlling a touch device, and the touch device.

BACKGROUND

Along with the development of the touch technology, as a novel human-machine interaction technique, for an electronic product, a traditional input and control mode using a physical keyboard or mouse has been gradually changed into a mode using a touch panel. The touch panel of a touch device is provided with a touch sensor capable of detecting a touch operation made by a user, so as to achieve the interaction between the touch device and the user.

Along with the wide application of the touch technology, most of the functions of the touch device have been integrated into the touch panel, and the touch device is provided with fewer physical buttons. Currently, most of the touch devices are each merely provided with such physical buttons as a Home button, a Lock button and a Volume button. Especially, for some touch devices, their Home buttons are also integrated into their touch panels.

However, when the touch panel of the touch device is broken due to collision, the touch sensor of the touch panel may be open circuit. In addition, there is not any physical button on the touch device for operating the touch panel. Hence, the touch device cannot interact with the user via the touch panel. At this time, it is impossible for the user to operate the touch panel of the touch device, so as to make a call, view an email, and so on.

SUMMARY

An object of the present disclosure is to provide a method and an apparatus for controlling a touch device, and the touch device, so as to enable the touch device to interact with the user via the touch panel even when the touch sensor of the touch device is open circuit.

In one aspect, the present disclosure provides in some embodiments a method for controlling a touch device, including steps of: detecting an Enabled instruction for an assistance mode of the touch device; enabling the assistance mode and displaying a preconfigured assistance mode operation interface on the touch device when the Enabled instruction for the assistance mode has been detected; and receiving an operational instruction generated when the assistance mode operation interface is operated via a physical button on the touch device and executing an operation response event corresponding to the operational instruction.

Alternatively, prior to the step of detecting the Enabled instruction for the assistance mode of the touch device, the method further includes detecting whether or not a touch sensor of the touch device is open circuit. The step of detecting the Enabled instruction for the assistance mode of the touch device includes detecting the Enabled instruction for the assistance mode when the touch sensor is open circuit.

Alternatively, the step of detecting the Enabled instruction for the assistance mode of the touch device includes detecting a triggering instruction for a first predetermined button combination, the triggering instruction for the first predetermined button combination being the Enabled instruction for the assistance mode, and the first predetermined button combination consisting of at least two predetermined physical buttons.

Alternatively, the step of detecting the Enabled instruction for the assistance mode of the touch device includes detecting a triggering instruction for a predetermined physical button and a shaking-to-triggering instruction of the touch device, the Enabled instruction for the assistance mode consisting of the triggering instruction for the predetermined physical button and the shaking-to-triggering instruction of the touch device.

Alternatively, the method further includes, when a triggering instruction for a second predetermined button combination has been detected upon the receipt of a request for audio or video communication from another device, accepting the request for audio or video commendation and performing the audio or video communication, and when a triggering instruction for a third predetermined button combination has been detected during the audio or video communication, terminating the audio or video communication. The second predetermined button combination and the third predetermined button combination each include at least two physical buttons.

Alternatively, the assistance mode operation interface includes a dial menu and/or a message toolbar.

Alternatively, the dial menu includes a dial pad and a dial window.

Alternatively, the message toolbar includes a mail toolbar and/or a short-message toolbar.

Alternatively, the assistance mode operation interface further includes an interface identifier for the assistance mode operation interface.

In another aspect, the present disclosure provides in some embodiments an apparatus for controlling a touch device, including: an instruction detection module configured to detect an Enabled instruction for an assistance mode of the touch device; a mode enabling module configured to enable the assistance mode and display a preconfigured assistance mode operation interface on the touch device when the Enabled instruction for the assistance mode has been detected; and an operation response module configured to receive an operational instruction generated when the assistance mode operation interface is operated via a physical button on the touch device, and execute an operation response event corresponding to the operational instruction.

Alternatively, the apparatus further includes a connection detection module configured to, prior to detecting the Enabled instruction for the assistance mode of the touch device by the instruction detection module, detect whether or not a touch sensor of the touch device is open circuit. The instruction detection module is configured to detect the Enabled instruction for the assistance mode when the touch sensor is open circuit.

Alternatively, the instruction detection module is configured to detect a triggering instruction for a first predetermined button combination, the triggering instruction for the first predetermined button combination is the Enabled instruction for the assistance mode, and the first predetermined button combination consists of at least two predetermined physical buttons.

Alternatively, the instruction detection module is configured to detect a triggering instruction for a predetermined physical button and a shaking-to-triggering instruction of the touch device, and the Enabled instruction for the assistance mode consists of the triggering instruction for the predetermined physical button and the shaking-to-triggering instruction of the touch device.

Alternatively, the apparatus further includes a control module. The instruction detection module is further configured to detect a triggering instruction for a second predetermined button combination when a request for audio or video communication is received by the touch device from another device. The control module is configured to, when the triggering instruction for the second predetermined button combination has been detected by the instruction detection module, control the touch device to accept the request for audio and video communication and perform the audio or video communication. The instruction detection module is further configured to detect a triggering instruction for a third predetermined button combination during the audio or video communication. The control module is further configured to, when the triggering instruction for the third predetermined button combination has been detected by the instruction detection module, control the touch device to terminate the audio or video communication. The second predetermined button combination and the third predetermined button combination each include at least two physical buttons.

Alternatively, the assistance mode operation interface includes a dial menu and/or a message toolbar.

Alternatively, the dial menu includes a dial pad and a dial window.

Alternatively, the assistance mode operation interface further includes an interface identifier for the assistance mode operation interface.

Alternatively, the message toolbar includes a mail toolbar and/or a short-message toolbar.

In yet another aspect, the present disclosure provides in some embodiments a touch device including at least two physical buttons, the above-mentioned apparatus for controlling the touch device, a storage unit configured to store a preconfigured assistance mode operation interface, and a display unit configured to display the assistance mode operation interface stored in the storage unit when an assistance mode is enabled by the apparatus for controlling the touch device.

According to the method and apparatus for controlling the touch device and the touch device in the embodiments of the present disclosure, the assistance mode may be enabled upon the detection of the Enabled instruction for the assistance mode of the touch device. Then, the assistance mode operation interface may be displayed on the touch device, the operational instruction generated when the assistance mode operation interface is operated via the at least two physical buttons on the touch device may be received, and the operation response even corresponding to the operational instruction may be executed. In other words, it is able for the user to operate the assistance mode operation interface via the physical button. In this way, no matter whether the touch sensor of the touch device is open circuit, it is able to control the touch panel via the physical buttons.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

Figure 1:
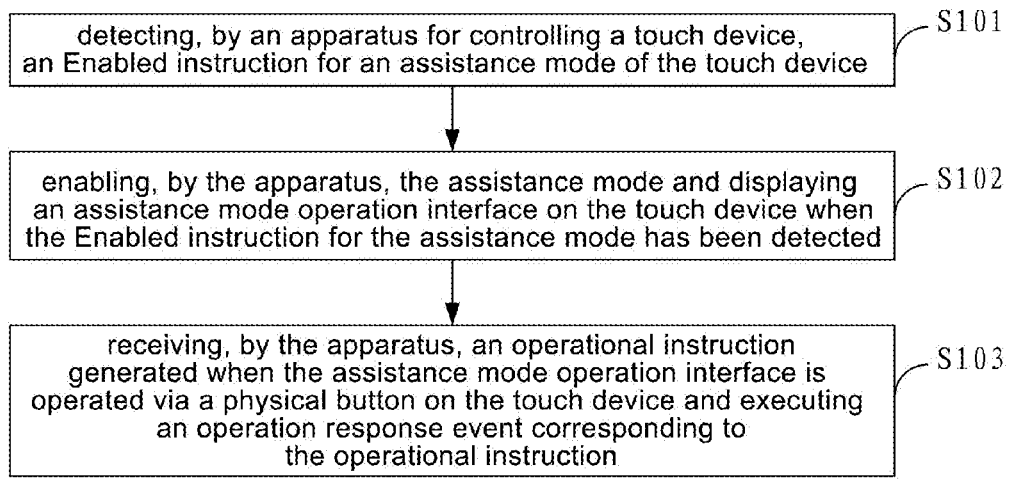
FIG. 1 is a flow chart of a method for controlling a touch device according to one embodiment of the present disclosure.

The present disclosure will be described hereinafter in conjunction with the drawings and embodiments. The following embodiments are for illustrative purposes only, but shall not be used to limit the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

In addition, the terms "system" and "network" may be replaced with each other. The expression "and/or" is merely used to describe the relationship between objects, and it includes three relationships. For example, "A and/or B" may represent that, there is only A, there are both A and B, and there is only B. Further, the symbol "/" usually refers to "or".

A method for controlling a touch device in some embodiments of the present disclosure may be applied to a scene where the touch device cannot interact with a user via a touch panel (e.g., a touch sensor of the touch panel is open circuit) or the user does not want to interact with the touch device by operating the touch panel of the touch device.

Usually, the touch panel of the touch device may be broken due to collision, and at this time, the touch sensor of the touch panel may be open circuit. Especially for a One Glass Solution (OGS) touch device where the touch sensor and a coverlens are integrated together, when the coverlens is broken, the touch sensor is inevitably open circuit. At this time, there is not any physical button on the touch device for operating the touch panel, so it is impossible for the touch device to interact with the user via the touch panel.

According to the method for controlling the touch device in some embodiments of the present disclosure, an assistance mode may be enabled when the touch sensor is open circuit and the touch device cannot interact with the user via the touch panel, or when the user does not want to interact with the touch device by operating the touch panel, so as to display an assistance mode operation interface. Then, an operational instruction generated when the assistance mode operation interface is operated via a physical button on the touch device may be received, and an operation response event corresponding to the operational instruction may be executed.

The method in the embodiments of the present disclosure may be executed by an apparatus for controlling the touch device. The apparatus may be a central processing unit (CPU) of the touch device, or a control unit or module of the touch device. In the embodiments of the present disclosure, the touch device may be any electronic device such as a touch mobile phone or a flat-panel computer.

The present disclosure will be described hereinafter in conjunction with the drawings, the embodiments and the application scenarios.

The present disclosure provides in one embodiment a method for controlling a touch device which, as shown in FIG. 1, includes the following steps.

Step 101: detecting, by an apparatus for controlling the touch device, an Enabled instruction for an assistance mode of the touch device.

When the touch device is in a standby state, the apparatus may determine whether or not the Enabled instruction for the assistance mode of the touch device has been detected by detecting a triggering instruction for a physical button on the touch device in real time, or by detecting the triggering instruction for the physical button on the touch device and detecting whether or not the touch device is being wobbled (shaken) at a certain frequency by a sensor.

Step S102: enabling, by the apparatus, the assistance mode and displaying an assistance mode operation interface on the touch device when the Enabled instruction for the assistance mode has been detected.

Upon the detection of the Enabled instruction for the assistance mode, the apparatus may call an assistance mode enabling program, so as to read a preconfigured parameter of the assistance mode from the touch device, and display the assistance mode operation interface on the touch device in accordance with the parameter.

For example, the assistance mode operation interface may include a dial menu and/or a message toolbar. The dial menu may include a dial pad and a dial window.

The message toolbar may be a mail toolbar or a short-message toolbar. Of course, the message toolbar may also include both the mail toolbar and the short-message toolbar.

Figure 2:
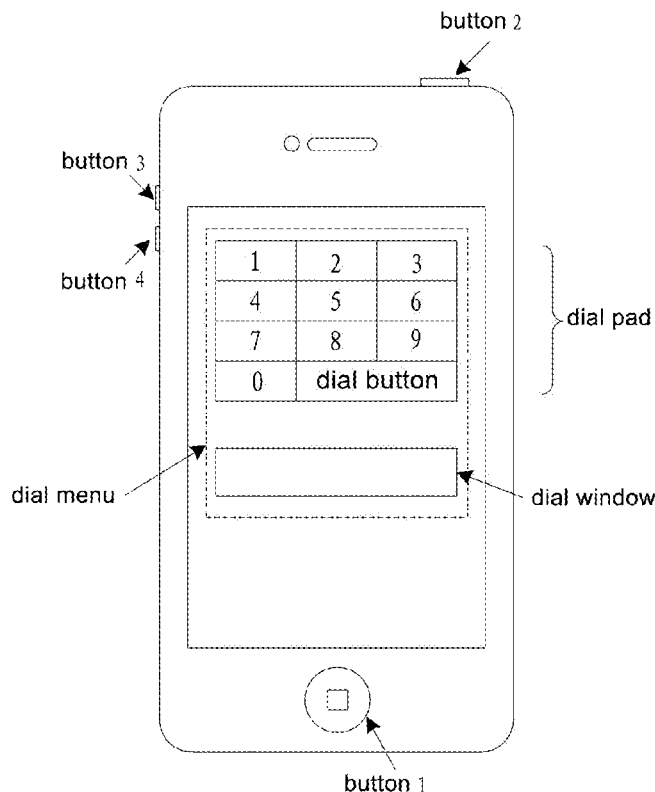
FIG. 2 is a schematic view showing an assistance mode operation interface according to one embodiment of the present disclosure.
Figure 3:
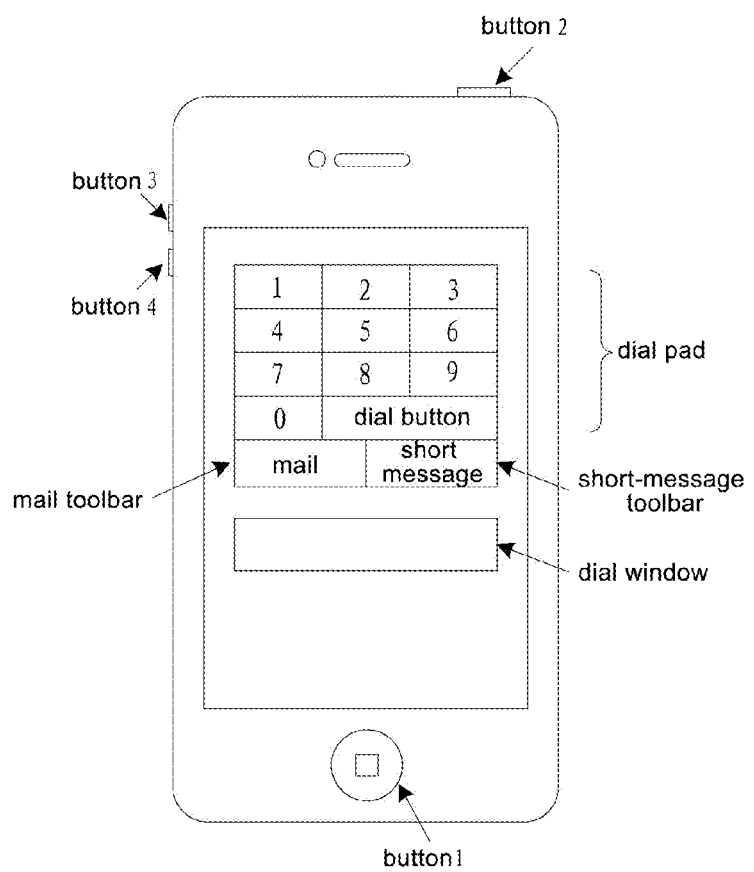
FIG. 3 is another schematic view showing the assistance mode operation interface according to one embodiment of the present disclosure.

Taking a mobile phone as an example, as shown in FIG. 2 which shows an assistance mode operation interface on the mobile phone, the assistance mode operation interface includes the dial menu consisting of the dial pad and the dial window, and as shown in FIG. 3 which shows another assistance mode operation interface on the mobile phone, the assistance mode operation interface includes the dial menu, the dial window, the mail toolbar and the short-message toolbar.

Currently, most of the touch devices are each merely provided with such physical buttons as a Home button (button 1 in FIG. 2 or 3), a Lock button (button 2 in FIG. 2 or 3), and Volume buttons (VolumeUp button 3 and VolumeDown button 4 in FIG. 2 or 3). Especially, for some touch devices, their Home buttons are also integrated into the touch panels.

As shown in FIG. 3, the assistance mode operation interface may include the dial pad, the dial window, the mail toolbar and the short-message toolbar. The user may select the numerals on the dial pad by operating the physical button (any one of the buttons 1-4), so as to dial a telephone number of his friend to be contacted or input any other account information (e.g., QQ identification (ID) or a WeChat ID). After the numerals on the dial pad are selected by operating the buttons 3 and 4, the selected numerals may be displayed in the dial window. The user may also select the mail toolbar or the short-message toolbar by operating the physical button (any one of the buttons 1-4), so as to view an email or a short message.

Step S103: receiving, by the apparatus, an operational instruction generated when the assistance mode operation interface is operated via a physical button on the touch device and executing an operation response event corresponding to the operational instruction.

In the assistance mode, the user may operate the assistance mode operation interface via the physical button on the touch device. During the operation, the apparatus for controlling the touch device may receive or detect the operational instruction generated when the user operates the assistance mode operation interface via the physical button, and execute the operation response event corresponding to the operational instruction.

According to the method for controlling the touch device in the embodiment of the present disclosure, the assistance mode may be enabled upon the detection of the Enabled instruction for the assistance mode of the touch device. Then, the assistance mode operation interface may be displayed on the touch device, the operational instruction generated when the assistance mode operation interface is operated via the at least two physical buttons on the touch device may be received, and the operation response even corresponding to the operational instruction may be executed. In other words, it is able for the user to operate the assistance mode operation interface via the physical button. In this way, no matter whether the touch sensor of the touch device is open circuit, it is able to control the touch panel via the physical buttons.

Figure 4:
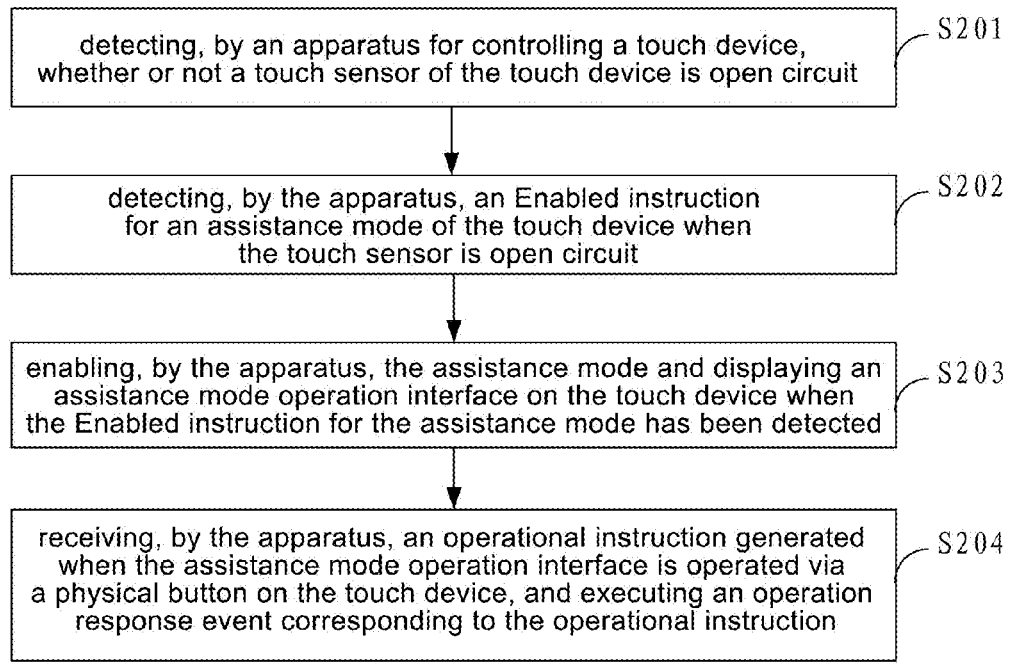
FIG. 4 is another flow chart of the method for controlling the touch device according to one embodiment of the present disclosure.

The present disclosure further provides in another embodiment the method for controlling the touch device which, as shown in FIG. 4, includes the following steps.

Step S201: detecting, by the apparatus, whether or not a touch sensor of the touch device is open circuit.

Alternatively, the apparatus detects the Enabled instruction for the assistance mode after the touch sensor is open circuit. In other words, in the embodiment of the present disclosure, when the touch sensor is open circuit and the touch device cannot interact with the user via the touch panel, the apparatus detects the Enabled instruction for the assistance mode and then enables the assistance mode. In this way, even when the touch sensor is open circuit and the touch device cannot be interact with the user via the touch panel, it is still able for the touch device to interact with the user by operating the assistance mode operation interface via the physical buttons.

The step of detecting, by the apparatus, whether or not the touch sensor is open circuit may include monitoring, by the apparatus, a touch operational instruction made by the user for operating the touch panel and sensed by the touch sensor, and when no touch operational instruction has been detected during a predetermined time period, determining that the touch sensor has been short-circuit.

The above way for determining whether or not the touch sensor is open circuit is merely for illustrative purposes, and any other ways mentioned in the related art may also be used.

Step S202: detecting, by the apparatus, the Enabled instruction for the assistance mode of the touch device when the apparatus detected that the touch sensor is open circuit.

When the touch device in the standby state, the apparatus may determine whether or not the Enabled instruction for the assistance mode of the touch device has been detected by detecting a triggering instruction for the physical buttons on the touch device (a physical button combination) in real time, or by detecting the triggering instruction for the physical buttons on the touch device and detecting whether or not the touch device is wobbled (shaken) at a certain frequency by a sensor.

Figure 5:
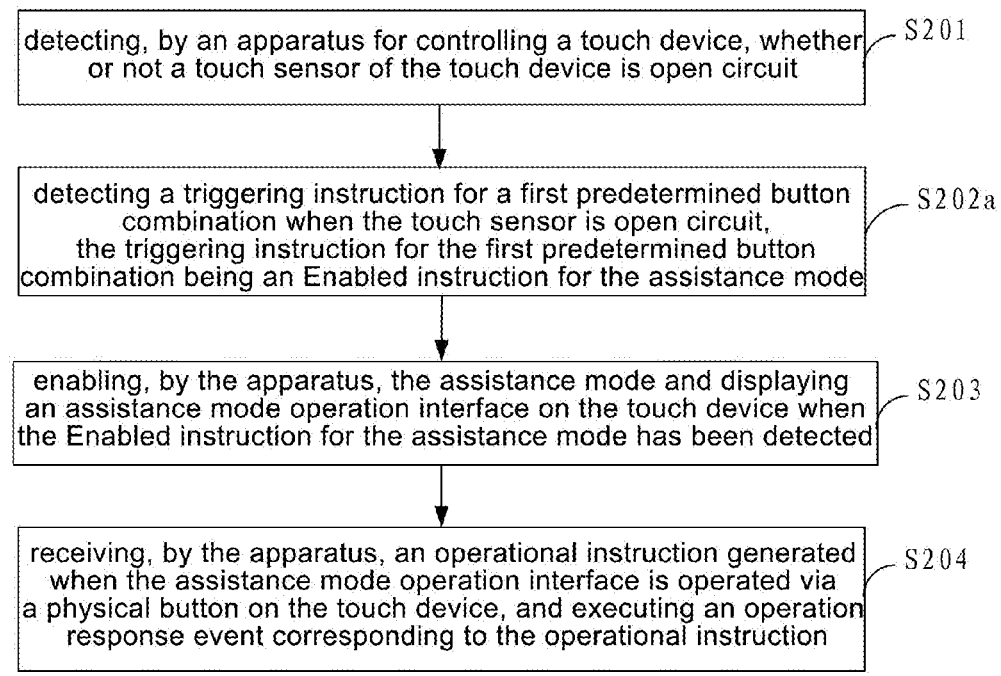
FIG. 5 is yet another flow chart of the method for controlling the touch device according to one embodiment of the present disclosure.

For example, in a first application scenario as shown in FIG. 5, Step S202 may include Step S202a of detecting a triggering instruction for a first predetermined button combination when it is detected that the touch sensor is open circuit. The triggering instruction for the first predetermined button combination is just the Enabled instruction for the assistance mode, and the first predetermined button combination includes at least two predetermined physical buttons.

It should be appreciated that, each physical button on the touch device is preconfigured with a corresponding function. When the apparatus determines whether or not the Enabled instruction for the assistance mode has been detected by detecting the triggering instruction for the physical buttons on the touch device in real time, it may use the detected triggering instructions for at least two physical buttons (i.e., the triggering instruction for the first predetermined button combination) as the Enabled instruction for the assistance mode. In other words, after the triggering instruction for the first predetermined button combination has been detected, it may be deemed that the Enabled instruction for the assistance mode has been detected.

Figure 6:
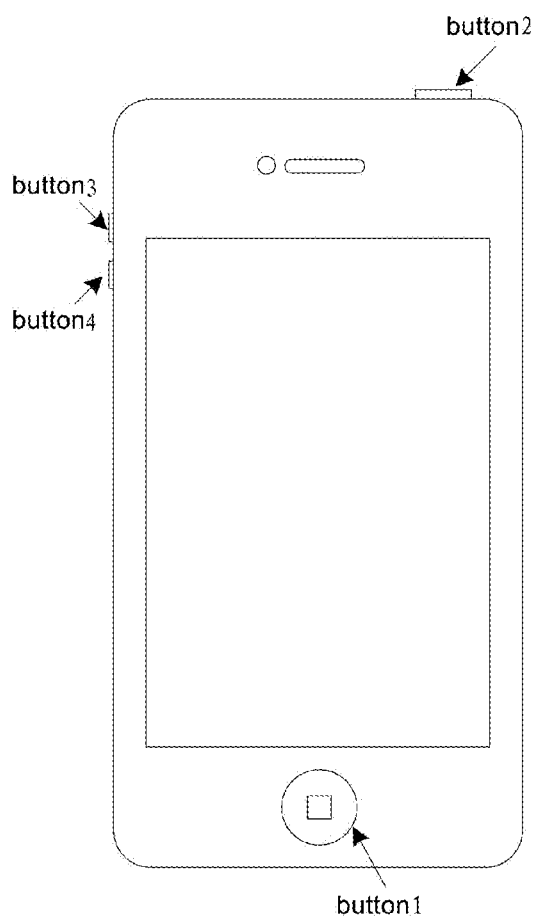
FIG. 6 is a schematic view showing the touch device according to one embodiment of the present disclosure.

Taking a mobile phone as an example, the triggering instruction for the first predetermined button combination may consist of a triggering instruction for the button 1 and a triggering instruction for the button 2, or consist of the triggering instruction for the button 1, the triggering instruction for the button 2 and a triggering instruction for the button 3, as shown in FIG. 6. Of course, the physical buttons included in the first predetermined button combination are not particularly defined herein. In FIG. 6, the button 1 is a Home button, the button 2 is a Lock button, the button 3 is a VolumeUp button, and the button 4 is a VolumeDown button.

Figure 7:
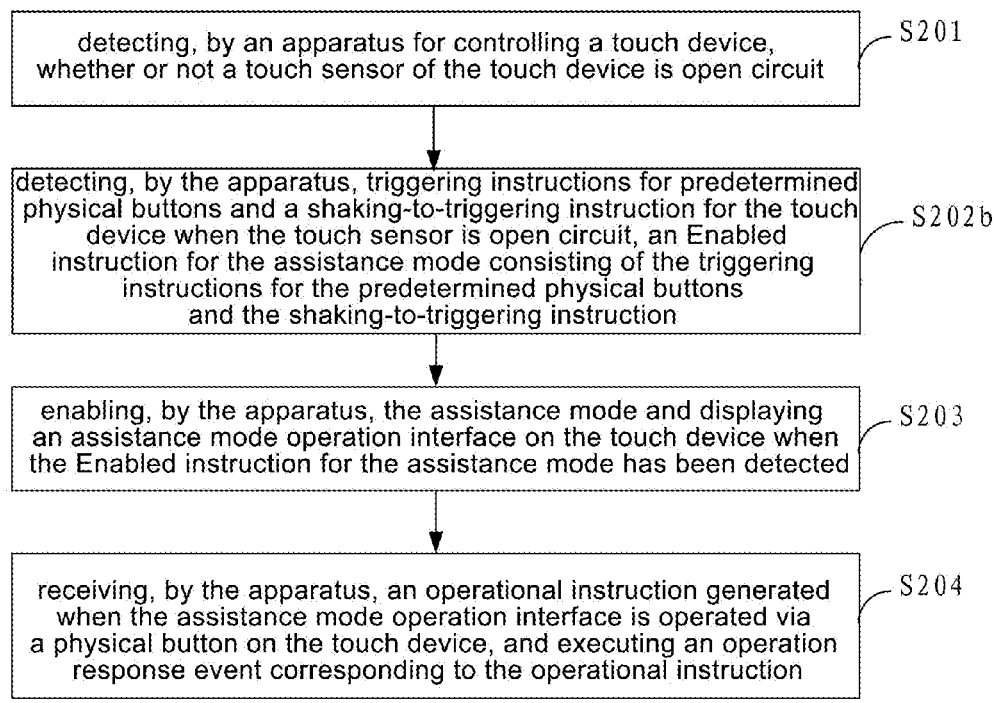
FIG. 7 still yet another flow chart of the method for controlling the touch device according to one embodiment of the present disclosure.

In a second application scenario as shown in FIG. 7, Step S202 may include Step S202b of detecting, by the apparatus, triggering instructions for predetermined physical buttons and a shaking-to-triggering instruction for the touch device when it is detected that the touch sensor is open circuit. The Enabled instruction for the assistance mode consists of the triggering instructions for the predetermined physical buttons and the shaking-to-triggering instruction.

Correspondingly, each physical button on the touch device is preconfigured with a corresponding function. When the apparatus determines whether or not the Enabled instruction for the assistance mode has been detected by detecting the triggering instructions for the physical buttons on the touch device in real time, it may use the detected triggering instruction for at least one physical button and the shaking-to-triggering instruction as the Enabled instruction for the assistance mode. In other words, after the triggering instruction for the at least one physical button and the shaking-to-triggering instruction have been detected, it may be deemed that the Enabled instruction for the assistance mode has been detected.

Taking a mobile phone as an example, as shown in FIG. 6, the Enabled instruction for the assistance mode may consist of the triggering instruction for the button 2 and the shaking-to-triggering instruction generated when the touch device is shaken, or consist of the triggering instruction for the button 1, the triggering instruction for the button 2 and the shaking-to-triggering instruction generated when the touch device is shaken.

Whether or not the mobile phone is shaken may be detected by a sensor in the touch device. When the touch device is shaken at a certain frequency, the sensor (e.g., a gravity sensor) may notify the apparatus that the touch device is being shaken.

Step S203: enabling, by the apparatus, the assistance mode and displaying the assistance mode operation interface on the touch device when the Enabled instruction for the assistance mode has been detected by the apparatus.

In the first application scenario, the triggering instruction for the first predetermined button combination is just the Enabled instruction for the assistance mode, and the first predetermined button combination consists of at least two physical buttons on the touch device.

Figure 8:
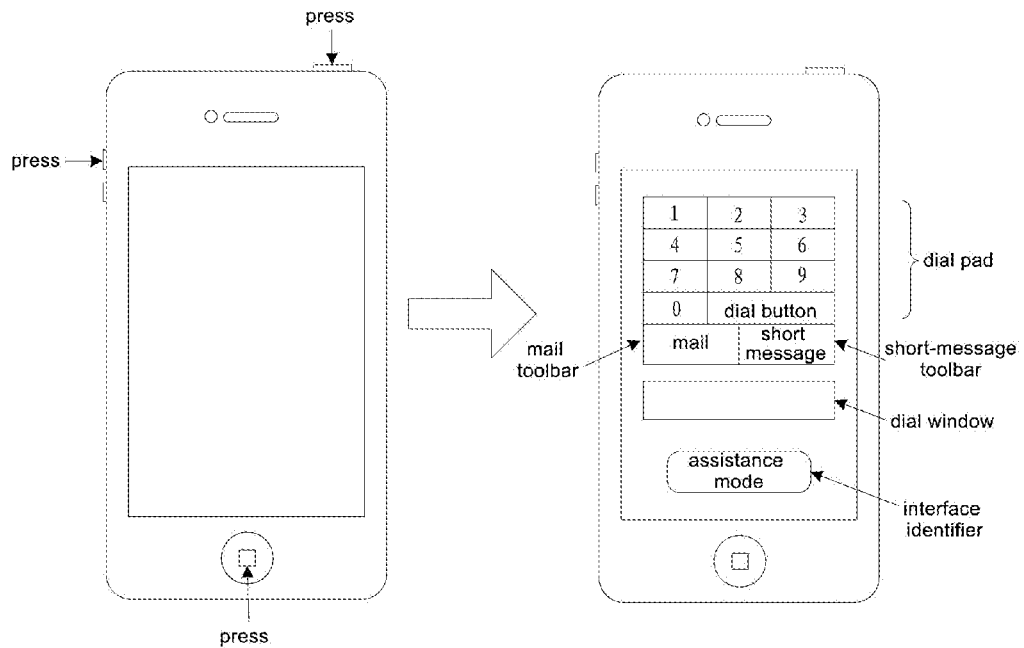
FIG. 8 is a schematic view showing the change of the assistance mode operation interface according to one embodiment of the present disclosure.

Taking a mobile phone as an example, the first predetermined button combination consists of the Lock button and the VolumeUp button. As shown in FIG. 8 (left view), when the Lock button and the VolumeUp button are triggered simultaneously, the apparatus may detect a triggering instruction for the Lock button and a triggering instruction for the VolumeUp button, i.e., the triggering instruction for the first predetermined button combination, and use the triggering instruction as the Enabled instruction for the assistance mode. Then, the apparatus may enable the assistance mode and display the assistance mode operation interface on the touch device as shown in FIG. 8 (right view).

In the second application scenario, the Enabled instruction for the assistance mode may consist of both the detected triggering instruction for the physical button and the shaking-to-triggering instruction of the touch device.

Figure 9:
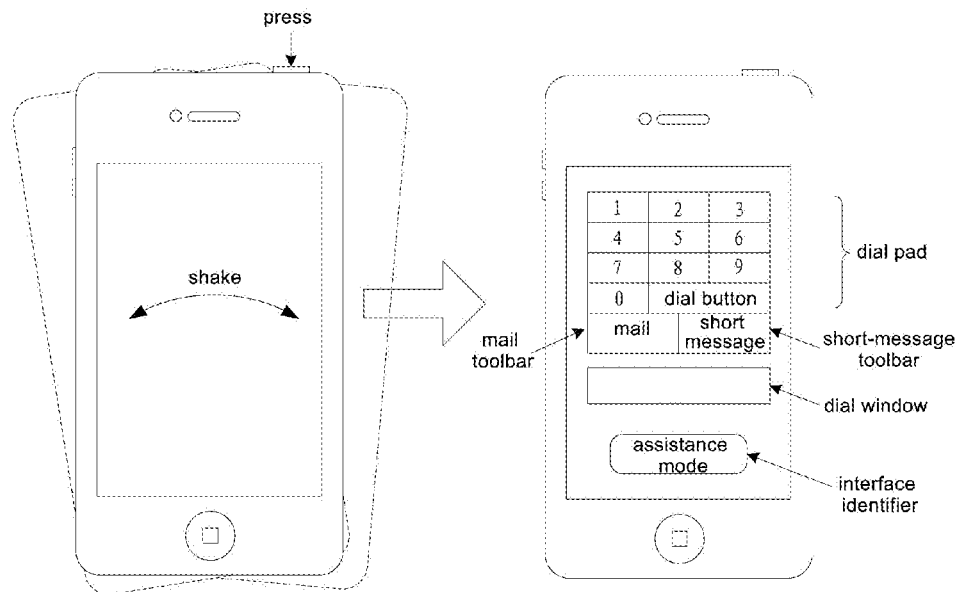
FIG. 9 is another schematic view showing the change of the assistance mode operation interface according to one embodiment of the present disclosure.

Taking a mobile phone as an example, the triggering instruction for the assistance mode consists of both the triggering instruction for the Lock button and the shaking-to-triggering instruction for the mobile phone. As shown in FIG. 9 (left view), when the Lock button is triggered and the mobile phone is being shaken, the apparatus may detect the triggering instruction for the Lock button and the shaking-to-triggering instruction for the mobile phone simultaneously, and use them as the Enabled instruction. Then, the apparatus may enable the assistance mode, and display the assistance mode operation interface on the touch device as shown in FIG. 9 (right view).

Alternatively, as shown in FIG. 8 or 9, the assistance mode operation interface may further include an interface identifier for the assistance mode operation interface.

Step S204: receiving, by the apparatus, an operational instruction generated when the assistance mode operation interface is operated via the physical buttons on the touch device, and executing an operation response event corresponding to the operational instruction.

To be specific, the apparatus may receive the operational instruction (e.g., a dial instruction, an acknowledgement instruction, a mail-viewing instruction or a short-message-viewing instruction) generated when the dial pad, the mail toolbar or the short-message toolbar on the assistance mode operation interface is operated by the user via the physical buttons on the touch device, and execute the operation response event corresponding to the operational instruction.

The step of receiving, by the apparatus, the operational instruction generated when the assistance mode operation interface is operated via the physical buttons on the touch device, and executing the operation response event corresponding to the operational instruction will be described hereinafter by taking a mobile phone as an example.

Figure 10:
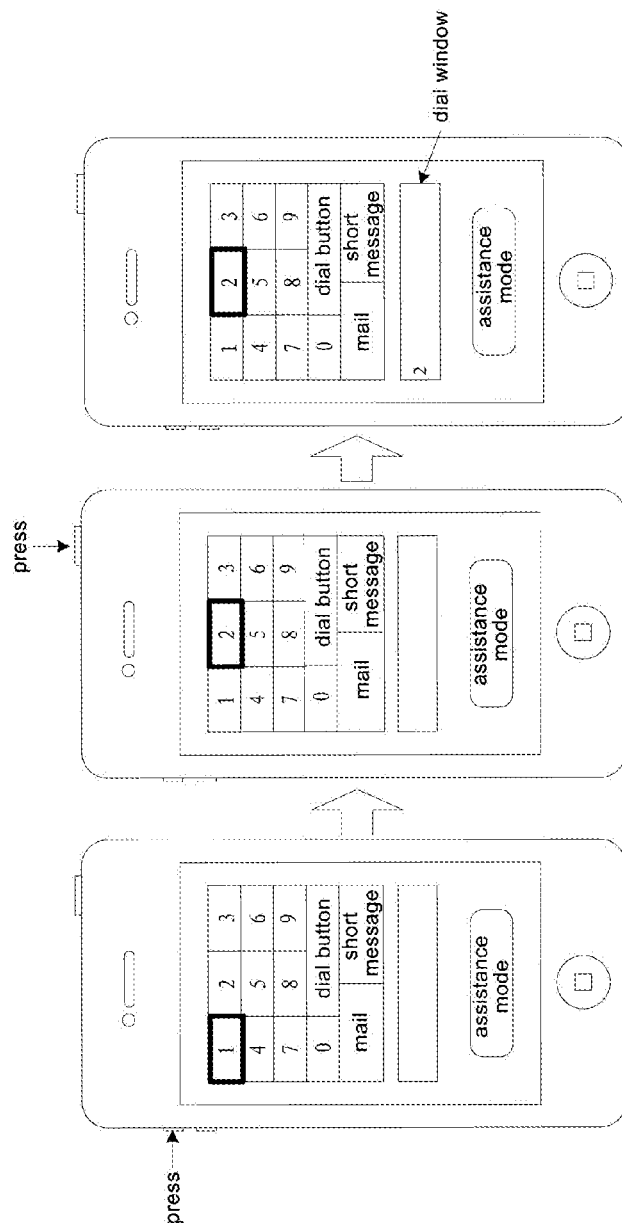
FIG. 10 is yet another schematic view showing the change of the assistance mode operation interface according to one embodiment of the present disclosure.

As shown in FIG. 10, in the embodiments of the present disclosure, when the assistance mode is enabled and the assistance mode operation interface is displayed on the touch device, a cursor (shown by a bold, black line in FIG. 10) may be displayed on a numeral button "1" on the dial pad. Of course, the cursor may also be displayed at any other positions (e.g., on any other numeral button, the mail toolbar or the short-message toolbar) of the assistance mode operation interface. Alternatively, after the assistance mode operation interface is displayed on the touch device, a triggering-calling cursor for the predetermined physical button may be received and then displayed at a predetermined position (on the numeral button, the mail toolbar or the short-message toolbar).

In the assistance mode, the user may control the movement of the cursor on the assistance mode operation interface by means of the VolumeUp and VolumeDown buttons, click the information toolbar by means of the Lock button, and return to an initial state of the assistance mode operation interface by means of the Home button. FIG. 3 and FIG. 8 (right views) show the initial state of the assistance mode operation interface.

Step S204 will be described hereinafter by taking a phone call made by operating the assistance mode operation interface via the physical buttons as an example.

As shown in FIG. 10, in the assistance mode, the apparatus may receive the triggering instruction for the VolumeUp and VolumeDown buttons, generate a cursor movement instruction, and control the movement of the cursor within the assistance mode operation interface. For example, when the user presses the VolumeUp button, the apparatus may receive the triggering instruction for the VolumeUp button, generate a cursor movement-to-right instruction, and control the cursor to move to the right. When the user presses the VolumeDown button, the apparatus may receive the triggering instruction for the VolumeDown button, generate a cursor movement-to-left instruction, and control the cursor to move to the left.

As shown in FIG. 10 (left view), a cursor is currently displayed on the numeral button "1" on the dial pad of the assistance mode operation interface. When the user presses the VolumeUp button, the apparatus may receive the triggering instruction for the VolumeUp button, generate a cursor movement-to-right instruction, and control the cursor to move to the right, so that the cursor is displayed on the numeral button "2", as shown in FIG. 10 (middle view). At this time, when the user presses the Lock button, the apparatus may receive the triggering instruction for the Lock button when the cursor is displayed on the numeral button "2", generate a numeral acknowledgement instruction, and input and display "2" within the dial window as shown in FIG. 10 (right view).

Figure 11:
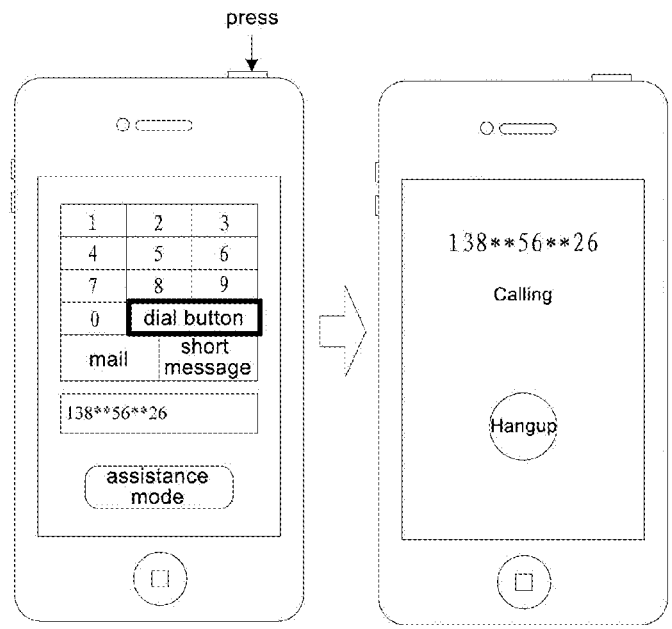
FIG. 11 is still yet another schematic view showing the change of the assistance mode operation interface according to one embodiment of the present disclosure.

As shown in FIG. 11, a telephone number "1385626" may be inputted and displayed within the dial window as mentioned above, and then the cursor may move to a dial button. At this time, when the user presses the Lock button, the apparatus may receive the triggering instruction for the Lock button when the cursor is displayed on the dial number, generate a dial instruction, and start to call the telephone number "1385626" as shown in FIG. 11 (right view).

When an error telephone number is inputted into the dial window or the user wants to return to the initial state of the assistance mode operation interface, the user may press the Home button. At this time, the apparatus may receive the triggering instruction for the Home button, generate an initial state returning instruction, and return to the initial state of the assistance mode operation interface as shown in FIG. 3 or FIG. 8 (right views).

Figure 12:
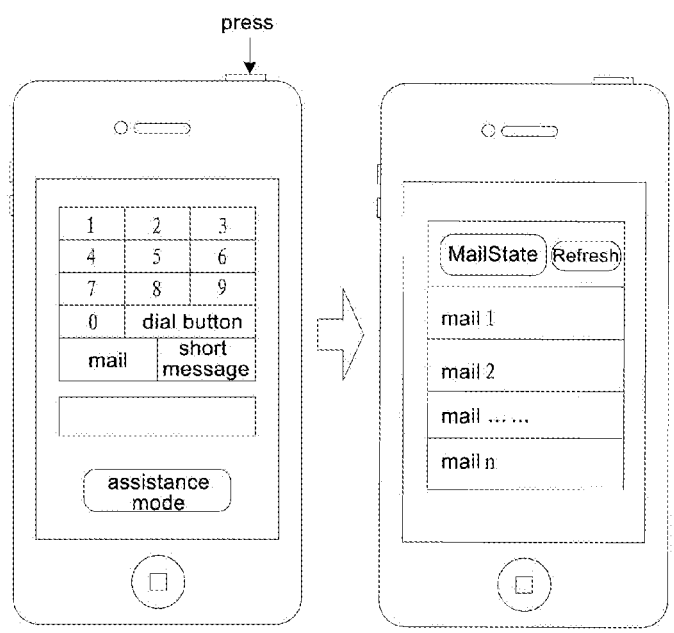
FIG. 12 is still yet another schematic view showing the change of the assistance mode operation interface according to one embodiment of the present disclosure.

As shown in FIG. 12, the cursor may move to the mail toolbar "Mail" as mentioned above. At this time, when the user presses the Lock button, the apparatus may receive the triggering instruction for the Lock button when the cursor is displayed on "Mail", generate a mail viewing instruction, and display a mail viewing window as shown in FIG. 12 (right view). The mail viewing window includes options such as MailState, Refresh and MailList. The "MailState" is used to indicate whether or not there is a new mail.

As shown in FIG. 12, the cursor may move to "Refresh" as mentioned above. At this time, when the user presses the Lock button, the apparatus may receive the triggering instruction for the Lock button when the cursor is displayed on "Refresh", generate a mail refreshing instruction, and update "MailState" and "MailList".

It should be appreciated that, the procedure of receiving, by the apparatus, the operational instruction generated when the assistance mode operation interface is operated via the physical buttons on the touch device and viewing the short message is similar to the above procedure of viewing the mail, and thus will not be repeated herein.

Figure 13:
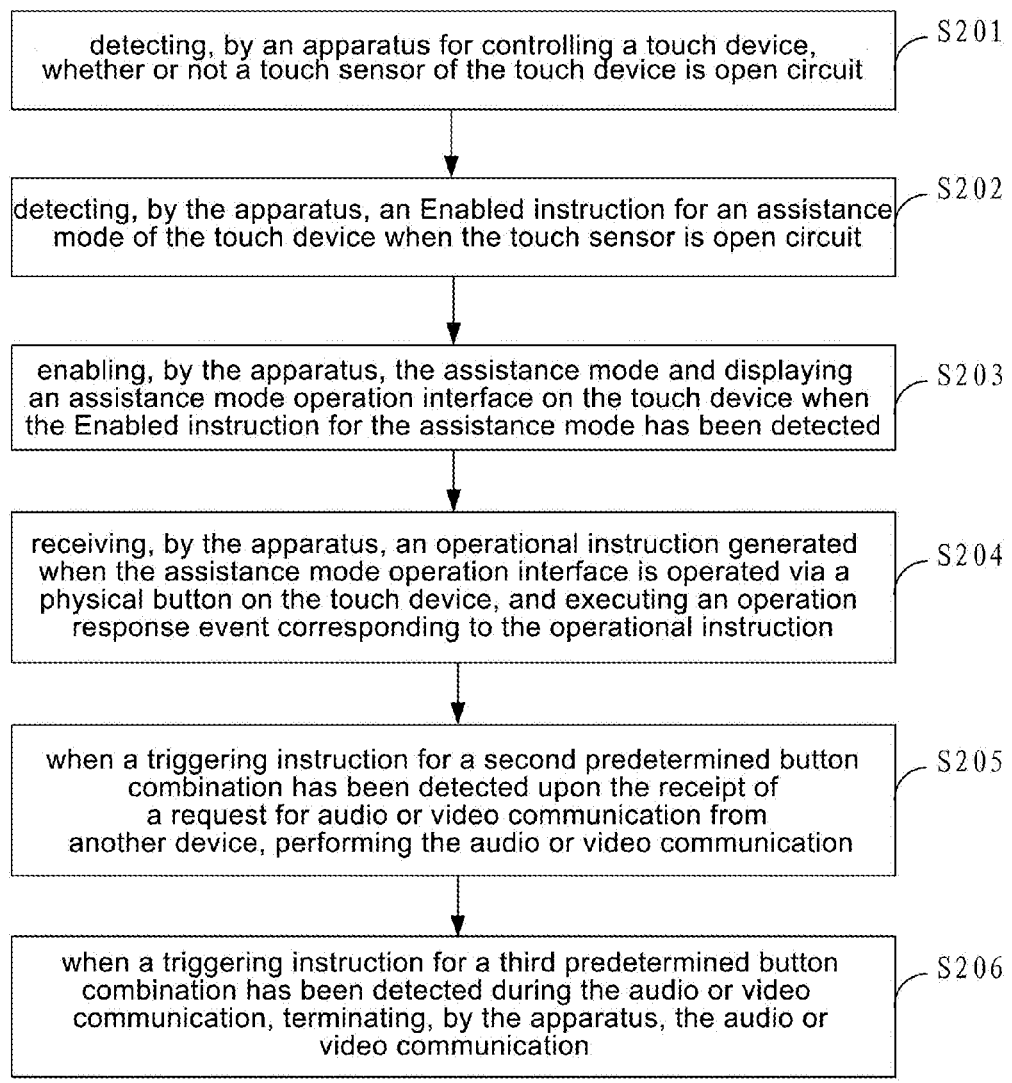
FIG. 13 is still yet another flow chart of the method for controlling the touch device according to one embodiment of the present disclosure.

As shown in FIG. 13, the method may further include Steps S205 and S206.

Step S205: when the triggering instruction for the second predetermined button combination has been detected upon the receipt of a request for audio or video communication from another device, performing the audio or video communication.

In the case that the touch device in the assistance mode receives the request for audio or video communication from the other device and the user wants to perform the audio or video communication, the user may press the second predetermined button combination (there are at least two physical buttons on the touch device). At this time, the apparatus may detect the triggering instruction for the second predetermined button combination, and after the triggering instruction has been detected, control the touch device to receive the request for audio or video communication and perform the audio or video communication.

Figure 14:
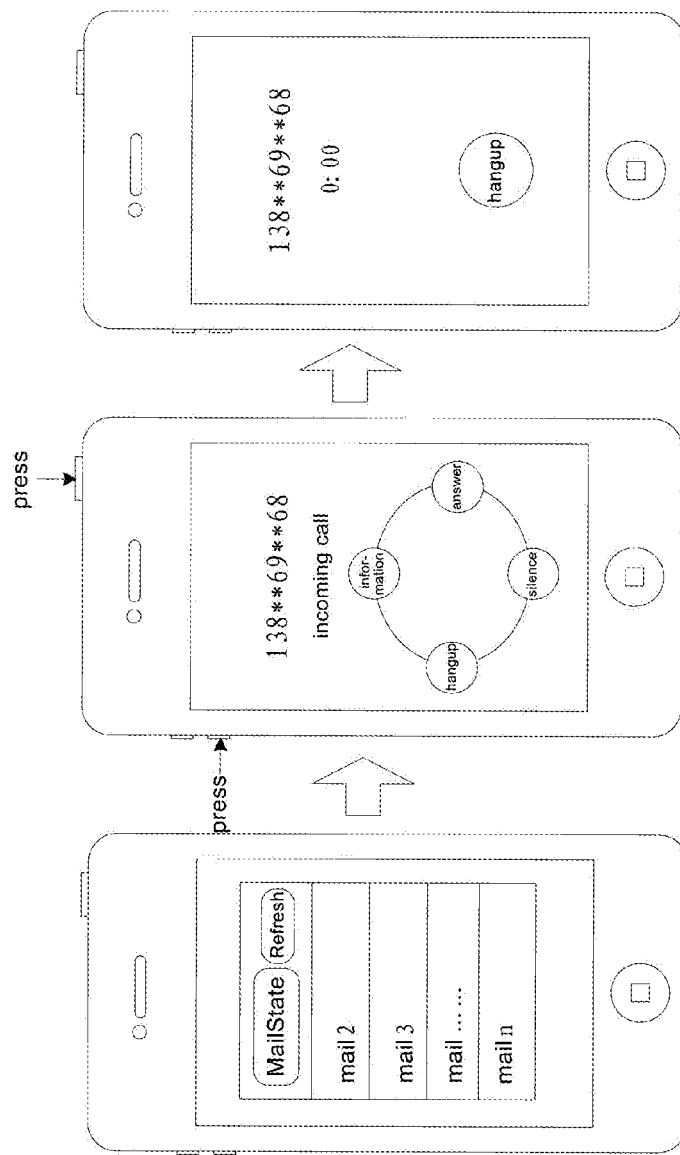
FIG. 14 is still yet another schematic view showing the change of the assistance mode operation interface according to one embodiment of the present disclosure.

Taking a mobile phone as an example, the mobile phone in the assistance mode displays the mail viewing window as shown in FIG. 14 (left view) and receives the request for the audio communication, e.g., an incoming call, from the other device as shown in FIG. 14 (middle view). At this time, when the touch sensor is open circuit and the touch device cannot interact with the user via the touch panel or when the user does not want to interact with the touch device by operating the touch panel, as shown in FIG. 14 (middle view), the user may press the Lock button and the VolumeDown button simultaneously, and the apparatus may detect the triggering instruction for the Lock button and the triggering instruction for the VolumeDown button (i.e., the triggering instruction for the second predetermined button combination) as shown in FIG. 14 (right view), so as to accept the request for the incoming call and perform the audio communication with the other user.

Of course, when the touch device receive the request for the audio or video communication from the other device but the user does not want to perform the audio or video communication, the user may press the physical buttons (e.g., a button combination different from the second predetermined button combination) so as to refuse the audio or video communication. Alternatively, when it is inconvenient for the user to perform the audio or video communication, the user may also press the physical buttons (e.g., a button combination different from the second predetermined button combination), so as to enable the touch device to be in a silence mode or send to the other device a predetermined reply message, e.g., "meeting in progress, back to you later".

Step S206: when a triggering instruction for a third predetermined button combination has been detected during the audio or video communication, terminating, by the apparatus, the audio or video communication.

Correspondingly, during the audio or video communication, when the user wants to terminate the current audio or video communication, the user may press the third predetermined button combination (there are at least two physical buttons on the touch device). At this time, the apparatus may detect the triggering instruction for the third predetermined button combination, and after the triggering instruction has been detected, control the touch device to terminate the audio or video communication.

It should be appreciated that, in the embodiments of the present disclosure, the user may press the first predetermined button combination, the second predetermined button combination and the third predetermined button combination so as to perform different operations on the touch device in different states. Hence, first predetermined button combination, the second predetermined button combination and the third predetermined button combination may be different from, or identical to, each other.

According to the method for controlling the touch device in the embodiments of the present disclosure, the assistance mode may be enabled upon the detection of the Enabled instruction for the assistance mode of the touch device. Then, the assistance mode operation interface may be displayed on the touch device, the operational instruction generated when the assistance mode operation interface is operated via the at least two physical buttons on the touch device may be received, and the operation response event corresponding to the operational instruction may be executed. In other words, it is able for the user to operate the assistance mode operation interface via the physical button. In this way, no matter whether the touch sensor of the touch device is open circuit, it is able to control the touch panel via the physical buttons.

Figure 15:
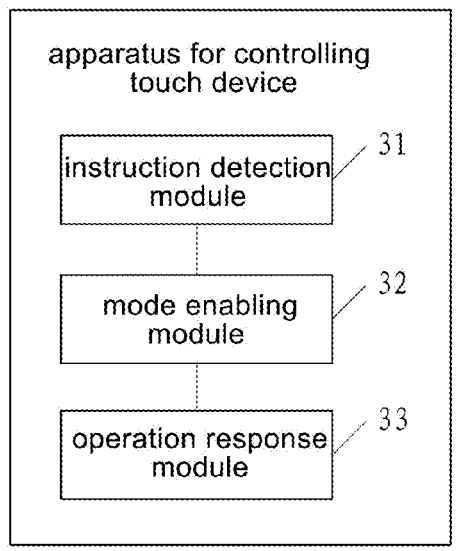
FIG. 15 is a schematic view showing an apparatus for controlling the touch device according to one embodiment of the present disclosure.

The present disclosure further provides in some embodiments an apparatus 30 for controlling the touch device which, as shown in FIG. 15, includes an instruction detection module 31 configured to detect an Enabled instruction for an assistance mode of the touch device, a mode enabling module 32 configured to enable the assistance mode and display a preconfigured assistance mode operation interface on the touch device when the Enabled instruction for the assistance mode has been detected, and an operation response module 33 configured to receive an operational instruction generated when the assistance mode operation interface is operated via a physical button on the touch device, and execute an operation response event corresponding to the operational instruction.

Figure 16:
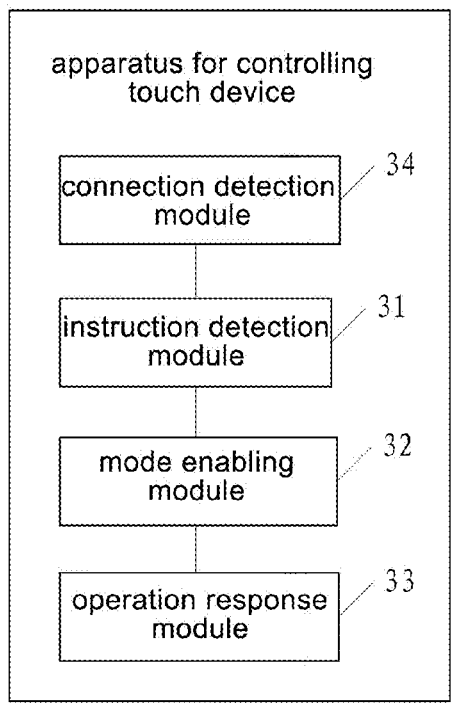
FIG. 16 is another schematic view showing the apparatus for controlling the touch device according to one embodiment of the present disclosure.

As shown in FIG. 16, the apparatus 30 may further include a connection detection module 34 configured to, prior to detecting the Enabled instruction for the assistance mode of the touch device by the instruction detection module, detect whether or not a touch sensor of the touch device is open circuit. The instruction detection module 31 is configured to detect the Enabled instruction for the assistance mode when the touch sensor is open circuit.

Further, the instruction detection module 31 is configured to detect a triggering instruction for a first predetermined button combination, the triggering instruction for the first predetermined button combination is the Enabled instruction for the assistance mode, and the first predetermined button combination consists of at least two predetermined physical buttons.

Further, the instruction detection module 31 is configured to detect a triggering instruction for a predetermined physical button and a shaking-to-triggering instruction of the touch device, and the Enabled instruction for the assistance mode consists of the triggering instruction for the predetermined physical button and the shaking-to-triggering instruction of the touch device.

Figure 17:
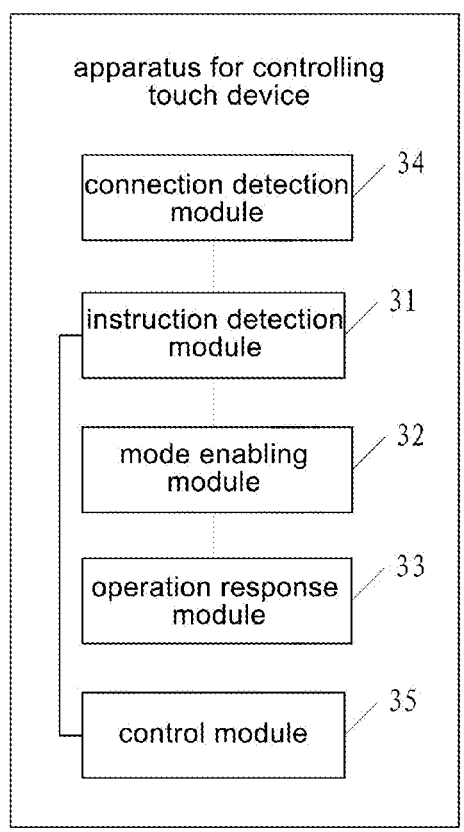
FIG. 17 is yet another schematic view showing the apparatus for controlling the touch device according to one embodiment of the present disclosure.

As shown in FIG. 17, the apparatus 30 may further include a control module 35. The instruction detection module 31 is further configured to detect a triggering instruction for a second predetermined button combination when a request for audio or video communication is received by the touch device from another device. The control module 35 is configured to, when the triggering instruction for the second predetermined button combination has been detected by the instruction detection module 31, control the touch device to perform the audio or video communication. The instruction detection module 31 is further configured to detect a triggering instruction for a third predetermined button combination during the audio or video communication. The control module 35 is further configured to, when the triggering instruction for the third predetermined button combination has been detected by the instruction detection module 31, control the touch device to terminate the audio or video communication. The second predetermined button combination and the third predetermined button combination each include at least two physical buttons.

Further, the assistance mode operation interface includes a dial menu and/or a message toolbar. The dial menu includes a dial pad and a dial window. The message toolbar includes a mail toolbar and/or a short-message toolbar.

It should be appreciated that, the description about some functional modules in the apparatus may refer to the above embodiments concerning the method, and thus will not be repeated herein.

The present disclosure further provides in some embodiments a touch device which includes at least two physical buttons, the above-mentioned apparatus for controlling the touch device, a storage unit configured to store a preconfigured assistance mode operation interface, and a display unit configured to display the assistance mode operation interface stored in the storage unit when an assistance mode is enabled by the apparatus for controlling the touch device.

According to the apparatus for controlling the touch device and the touch device in the embodiments of the present disclosure, the assistance mode may be enabled upon the detection of the Enabled instruction for the assistance mode of the touch device. Then, the assistance mode operation interface may be displayed on the touch device, the operational instruction generated when the assistance mode operation interface is operated via the at least two physical buttons on the touch device may be received, and the operation response event corresponding to the operational instruction may be executed. In other words, it is able for the user to operate the assistance mode operation interface via the physical button. In this way, no matter whether the touch sensor of the touch device is open circuit, it is able to control the touch panel via the physical buttons.

It should be appreciated that, for convenience and simplicity, the above description is merely given on the basis of the functional modules. During the actual application, the above functions may be achieved by different functional modules in accordance with the practical need, i.e., different functional modules may be provided so as to achieve all or parts of the functions. The operational procedures of the system, apparatus and modules may refer to the above embodiments concerning the method, and thus will not be repeated herein.

It should be further appreciated that, the system, apparatus and method may be implemented in any other ways. For example, the embodiments for the apparatus are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units as separate components may be, or may not be, separated from each other physically, and the components may be, or may not be, physical units. They may be located at an identical position, or distributed over a plurality of network elements. All or parts of the components may be selected in accordance with the practical need so as to achieve the object of the present disclosure.

In addition, the functional units in the embodiments of the present disclosure may be integrated into a processing unit, or the functional units may exist independently, or two or more functional units may be combined together. The integrated functional units may be implemented in a hardware or software form.

When the integrated functional units are implemented in a software form and sold or used as a separate product, they may be stored in a computer-readable storage medium. Based on this, the technical solutions of the present disclosure, partial or full, or parts of the technical solutions of the present disclosure contributing to the related art, may appear in the form of software products, which may be stored in a non-volatile storage medium (a universal serial bus (USB) flash disk, a mobile hard disk (HD), a read-only memory (ROM), a random access memory (RAM), a magnetic disk or an optical disk) and include several instructions so as to enable a computer equipment (a personal computer, a server or network equipment) to execute all or parts of the steps of the methods according to the embodiments of the present disclosure.

The above are merely the preferred embodiments of the present disclosure. A person skilled in the art may make further improvements and modifications without departing from the spirit of the present disclosure, and these improvements and modifications shall also fall within the scope of the present disclosure.

What is claimed is:

1. An apparatus for controlling a touch device, comprising: an instruction detection module configured to detect an enabled instruction for an assistance mode of the touch device; a mode enabling module configured to enable the assistance mode and display a preconfigured assistance mode operation interface on the touch device when the enabled instruction for the assistance mode has been detected; and an operation response module configured to receive an operational instruction generated when the assistance mode operation interface is operated via a physical button on the touch device, and execute an operation response event corresponding to the operational instructions;
    wherein the instruction detection module is configured to: detect a triggering instruction for a first predetermined button combination, the triggering instruction for the first predetermined button combination being the enabled instruction for the assistance mode, and the first predetermined button combination consisting of at least two predetermined physical buttons, or detect a triggering instruction for a predetermined physical button and a shaking-to-triggering instruction of the touch device, the enabled instruction for the assistance mode consisting of the triggering instruction for the predetermined physical button and the shaking-to-triggering instruction of the touch device.

2. The apparatus according to claim 1, further comprising a connection detection module configured to, prior to detecting the enabled instruction for the assistance mode of the touch device by the instruction detection module, detect whether or not a touch sensor of the touch device is open circuit, wherein the instruction detection module is configured to detect the enabled instruction for the assistance mode when the touch sensor is open circuit.

3. The apparatus according to claim 1, further comprising a control module, wherein the instruction detection module is further configured to detect a triggering instruction for a second predetermined button combination when a request for audio or video communication is received by the touch device from another device;

the control module is configured to, when the triggering instruction for the second predetermined button combination has been detected by the instruction detection module, control the touch device to accept the request for audio and video communication and perform the audio or video communication;

the instruction detection module is further configured to detect a triggering instruction for a third predetermined button combination during the audio or video communication;

the control module is further configured to, when the triggering instruction for the third predetermined button combination has been detected by the instruction detection module, control the touch device to terminate the audio or video communication; and the second predetermined button combination and the third predetermined button combination each comprise at least two physical buttons.

4. The apparatus according to claim 1, wherein the assistance mode operation interface comprises a dial menu and/or a message toolbar.

5. The apparatus according to claim 4, wherein the message toolbar comprises a mail toolbar and/or a short-message toolbar.

6. The apparatus according to claim 4, wherein the assistance mode operation interface further comprises an interface identifier for the assistance mode operation interface.

7. The apparatus according to claim 1, wherein the dial menu comprises a dial pad and a dial window.

8. A touch device, comprising:
at least two physical buttons;
the apparatus for controlling the touch device according to claim 1;
a storage unit configured to store a preconfigured assistance mode operation interface; and
a display unit configured to display the assistance mode operation interface stored in the storage unit when an assistance mode is enabled by the apparatus for controlling the touch device.

9. A method for controlling a touch device, comprising steps of: detecting an enabled instruction for an assistance mode of the touch device; enabling the assistance mode when the enabled instruction for the assistance mode has been detected and displaying a preconfigured assistance mode operation interface on the touch device; and receiving an operational instruction generated when the assistance mode operation interface is operated via a physical button on the touch device and executing an operation response event corresponding to the operational instructions;

wherein the step of detecting the enabled instruction for the assistance mode of the touch device comprises:
detecting a triggering instruction for a first predetermined button combination, the triggering instruction for the first predetermined button combination being the enabled instruction for the assistance mode, and the first predetermined button combination consisting of at least two predetermined physical buttons, or detecting a triggering instruction for a predetermined physical button and a shaking-to-triggering instruction of the touch device, the enabled instruction for the assistance mode consisting of the triggering instruction for the predetermined physical button and the shaking-to-triggering instruction of the touch device.

10. The method according to claim 9, wherein prior to the step of detecting the enabled instruction for the assistance mode of the touch device, the method further comprises detecting whether or not a touch sensor of the touch device is open circuit, and the step of detecting the enabled instruction for the assistance mode of the touch device comprises detecting the enabled instruction for the assistance mode when the touch sensor is open circuit.

11. The method according to claim 10, wherein the step of detecting the enabled instruction for the assistance mode of the touch device comprises:
detecting a triggering instruction for a first predetermined button combination, the triggering instruction for the first predetermined button combination being the enabled instruction for the assistance mode, and the first predetermined button combination consisting of at least two predetermined physical buttons, or
detecting a triggering instruction for a predetermined physical button and a shaking-to-triggering instruction of the touch device, the enabled instruction for the assistance mode consisting of the triggering instruction for the predetermined physical button and the shaking-to-triggering instruction of the touch device.

12. The method according to claim 10, wherein the assistance mode operation interface comprises a dial menu and/or a message toolbar.

13. The method according to claim 9, further comprising:
when a triggering instruction for a second predetermined button combination has been detected upon the receipt of a request for audio or video communication from another device, accepting the request for audio or video commendation and performing the audio or video communication, and when a triggering instruction for a third predetermined button combination has been detected during the audio or video communication, terminating the audio or video communication, wherein the second predetermined button combination and the third predetermined button combination each comprise at least two physical buttons.

14. The method according to claim 9, wherein the assistance mode operation interface comprises a dial menu and/or a message toolbar.

15. The method according to claim 14, wherein the dial menu comprises a dial pad and a dial window.

16. The method according to claim 15, wherein the assistance mode operation interface further comprises an interface identifier for the assistance mode operation interface.

17. The method according to claim 14, wherein the message toolbar comprises a mail toolbar and/or a short-message toolbar.

18. The method according to claim 14, wherein the assistance mode operation interface further comprises an interface identifier for the assistance mode operation interface.

* * * * *